United States Patent
Bahirat et al.

(10) Patent No.: US 11,429,284 B2
(45) Date of Patent: Aug. 30, 2022

(54) DATA CATEGORIZATION BASED ON INVALIDATION VELOCITIES

(71) Applicant: Micron Technology, Inc., Boise, ID (US)

(72) Inventors: Shirish D. Bahirat, Longmont, CO (US); Jonathan M. Haswell, San Jose, CA (US); William Akin, Morgan Hill, CA (US)

(73) Assignee: Micron Technology, Inc., Boise, ID (US)

( * ) Notice: Subject to any disclaimer, the term of this patent is extended or adjusted under 35 U.S.C. 154(b) by 59 days.

(21) Appl. No.: 16/700,285

(22) Filed: Dec. 2, 2019

(65) Prior Publication Data

US 2020/0142613 A1    May 7, 2020

Related U.S. Application Data

(63) Continuation of application No. 15/819,692, filed on Nov. 21, 2017, now Pat. No. 10,496,297.

(51) Int. Cl.
| | |
|---|---|
| *G06F 3/06* | (2006.01) |
| *G06F 12/02* | (2006.01) |
| *G06F 12/126* | (2016.01) |
| *G06F 12/0868* | (2016.01) |

(52) U.S. Cl.
CPC ............ *G06F 3/0619* (2013.01); *G06F 3/065* (2013.01); *G06F 3/0656* (2013.01); *G06F 3/0679* (2013.01); *G06F 12/0246* (2013.01); *G06F 12/0253* (2013.01); *G06F 12/0868* (2013.01); *G06F 12/126* (2013.01); *G06F 2212/312* (2013.01); *G06F 2212/7201* (2013.01); *G06F 2212/7205* (2013.01); *G06F 2212/7208* (2013.01); *G06F 2212/7211* (2013.01)

(58) Field of Classification Search
None
See application file for complete search history.

(56) References Cited

U.S. PATENT DOCUMENTS

| | | | |
|---|---|---|---|
| 8,799,561 B2 | 8/2014 | Bux et al. | |
| 2010/0011137 A1* | 1/2010 | McGowan | ............... G06F 13/28 710/105 |
| 2012/0124294 A1* | 5/2012 | Atkisson | ............... H04L 12/403 711/135 |
| 2012/0127973 A1 | 5/2012 | Lin | |
| 2015/0261797 A1 | 9/2015 | Alcantara et al. | |
| 2015/0324255 A1* | 11/2015 | Kochunni | ................ G06F 3/065 711/162 |
| 2016/0179386 A1* | 6/2016 | Zhang | ................... G06F 3/0688 711/103 |
| 2017/0185322 A1* | 6/2017 | Stephens | ............... G06F 12/128 |
| 2018/0088853 A1* | 3/2018 | Kotra | .................. G06F 12/0842 |
| 2018/0107391 A1 | 4/2018 | Hashimoto | |
| 2018/0113634 A1* | 4/2018 | Simionescu | ............ G06F 3/067 |
| 2018/0307417 A1 | 10/2018 | Dubeyko | |
| 2019/0018784 A1 | 1/2019 | Ishii | |

\* cited by examiner

*Primary Examiner* — Charles Rones
*Assistant Examiner* — Jonah C Krieger
(74) *Attorney, Agent, or Firm* — Brooks, Cameron & Huebsch, PLLC (57) ABSTRACT

In an example, an apparatus may include a memory comprising a number of groups of memory cells and a controller coupled to the memory and configured to track respective invalidation velocities of the number of groups of memory cells and to assign categories to the number of groups of memory cells based on the invalidation velocities.

16 Claims, 6 Drawing Sheets

DATA CATEGORIZATION BASED ON INVALIDATION VELOCITIES

PRIORITY INFORMATION

This application is a Continuation of U.S. application Ser. No. 15/819,692, filed on Nov. 21, 2017, the contents of which are incorporated herein by reference.

TECHNICAL FIELD

The present disclosure relates generally to memories, and more particularly, to data categorization based on invalidation velocities

BACKGROUND

Storage systems may be implemented in electronic systems, such as computers, cell phones, hand-held electronic devices, etc. Some storage systems, such as solid state drives (SSDs), may include non-volatile memory devices. Non-volatile memory devices provide persistent data by retaining stored data when not powered and may include NAND flash memory, among other types of memory.

An SSD can be used, for example, to replace hard disk drives as the main storage volume for a computer due to advantages over hard disk drives in terms of performance, size, weight, ruggedness, operating temperature range, and power consumption. For instance, SSDs offer relatively good bandwidth and random I/O (input/output) performance along with a relatively good lifespan due to an absence of moving parts.

Various non-volatile memory devices of an SSD, such as NAND flash memory devices, can be organized in groups of cells that can be referred to as blocks. Each block can include physical pages. Read and write operations in the SSD may be performed at a page level; however, with NAND memory, erase operations typically may be performed at the block level such that overwriting (e.g., replacing) any page of data requires erasing the block in which the page resides. Generally, with NAND memory, rather than overwriting a page of a particular block, updated data can be written to "free" (e.g., erased) page of a different block and the page comprising the old data can be marked as an invalid page.

During operation of an SSD with NAND memory, a process referred to as "garbage collection" can be performed to maintain a free block pool. The free block pool can comprise blocks that contain free pages that are available for writing new data. The free blocks can be reclaimed from memory blocks that may be filled with both valid and invalid data. For example, valid data can refer to data corresponding to a page having a current (e.g., up to date) logical to physical mapping entry, and invalid data can refer to data corresponding to a page whose mapping entry is stale (e.g., the corresponding logical page has been remapped to a new physical page).

The garbage collection process can involve identifying a candidate block (e.g., a victim block) for reclaiming. Any valid pages (i.e., pages containing data that is not to be overwritten) residing in the candidate block are copied to another memory block, and the candidate block is erased, such that the candidate block becomes a free block that can be added to the free block pool. The garbage collection process requires read and write operations that results in write amplification, which can increase SSD power consumption and can decrease the lifespan of the SSD, for example, since the memory cells may become unusable after experiencing a certain number of program/erase cycles.

DETAILED DESCRIPTION

A number of embodiments of the present disclosure provide technical advantages, such as reduced write amplifications and improved garbage collection compared to previous approaches. Various embodiments categorize data based on invalidation velocities and/or invalidation accelerations and allow for garbage collection to be performed based on the categorized data. For example, data having the same category can be assigned to the same block, which provides the technical advantage of reducing write amplification in association with performing garbage collection. In some embodiments, flush priorities may be assigned to buffers based on data stream categories assigned to the buffers in order to reduce garbage collection activity. In some examples, a data stream refers to data being sent from a host to a storage system for storage. A flush priority may refer to a priority assigned to data in a buffer that is to be transferred to the memory of a storage device. For example, transferring data from a buffer to the memory may be referred to as flushing the data.

Write amplification may be defined as the amount of new data that is written to a device by a host plus the valid data that is written within the device (e.g., during garbage collection) from one block to another divided by the new data that is written to a device by host. Therefore, the write amplification is a measure of the total number of writes performed by the device. It is apparent that the total number of writes, and thus the write amplification, increases as the number of writes performed during garbage collection increases. An increased number of writes can increase the power consumption of the device and can decrease the lifespan of the device.

Some previous garbage collection approaches implemented by a memory controller may include tracking (e.g., via a table) a quantity of valid physical translation units (PTUs) per block (e.g., a valid PTU count) and then selecting a block having the lowest valid PTU count as a candidate block for garbage collection. Selecting blocks having relatively low valid PTU counts can reduce the number of writes during garbage collection, and thus the write amplification.

A PTU may correspond to one or more pages of data and may be identified by a corresponding physical address. An invalid PTU refers to a PTU for which a current logical to physical mapping does not exist, because the corresponding data has been rewritten to a new physical location, for example, and a valid PTU refers to a PTU for which a current logical to physical mapping exists. The valid PTU count is, for example, the quantity of valid PTUs in a block. Garbage collection can involve targeting blocks for erasure (e.g., candidate blocks) that have relatively few valid PTUs (e.g., those with a lowest valid PTU count), and then rewriting the valid PTUs to different physical locations (e.g., to a different block) prior to erasing the candidate block.

However, simply performing garbage collection based on valid PTU counts per block does not account for the fact that PTUs can have different respective lifespans, which can vary significantly. As an example, data corresponding to event logs or data logs may have a relatively short life span as compared to data corresponding to user profile data, operating system files, or application executable files. The life span of a PTU can refer to the time between when it is written (e.g., as a valid page) and when it is invalidated. For example, data may be invalidated due to its corresponding logical physical mapping becoming stale due erasure of a file to which the data corresponds, updating of the logical to physical mapping, etc. Mixing PTUs having different life spans within a same block can lead to increased write amplification, since when the block is erased, only the invalid PTUs will be erased and the remaining valid PTUs will be rewritten to a different block during garbage collection. A number of embodiments of the present disclosure group data having a same or similar lifespan together to a separate block. By grouping the data, embodiments of the present disclosure can reduce, for example, write amplification in association with performing garbage collection.

A number of embodiments of the present disclosure include tracking the history of valid PTU counts corresponding to respective groups of cells (e.g., per block and/or block stripe), which can be used to determine an invalidation velocity and/or invalidation acceleration associated with respective groups. As used herein, valid track count (VTC) will be used to refer to a valid PTU count. The VTC history can be tracked based on changes to VTCs over time and/or by tracking changes to a VTC curve corresponding to a system (e.g., SSD system) over time. Although various examples herein may refer to a block or blocks, unless explicitly stated, such references are applicable to block stripes. In some examples, a block stripe will be used to refer to a group of blocks organized together for various read, write, erase, and/or garbage collection purposes.

In some examples, the number of valid PTUs (e.g., the VTC) at particular (e.g., predetermined) times (e.g., instants of time) during the operation of the storage system may be obtained for a block or a block stripe. Each respective VTC may then be plotted at its respective instant of time to generate a VTC curve. The time rate of change (e.g., the slope) of the VTC curve gives the rate at which the PTUs are being invalidated, and thus may be referred to as the invalidation velocity. The time rate of change of the slope of the VTC curve, and thus the invalidation velocity, may be referred to as the invalidation acceleration. The VTC profile gives how the VTC behaves with time (e.g. the timewise behavior of the VTC). For example, the VTC profile is the shape of the VTC curve. For instance, the invalidation velocity and, in instances when the invalidation velocity is changing with time, the invalidation acceleration can be determined from the VTC profile.

In a number of embodiments, data can be categorized, for example, into one of a number of different data stream types. In one example, the categorization can be based on a determined invalidation velocity (which may be referred to as an invalidation rate). In another example, the categorization can be based on a determined invalidation acceleration corresponding to the data. The invalidation accelerations may be used (e.g., during writing) to decide the order in which block should be wear leveled. In some examples, garbage collection may be performed on the blocks with the lower invalidation accelerations before blocks with higher accelerations. For instance, blocks having lower accelerations may be colder than blocks with higher accelerations. In another example, the categorization can be based on a combination of invalidation velocity and invalidation acceleration. For instance, a number of different invalidation velocity ranges can correspond to respective different data categories. Data categories can represent various data types or data stream types. Data stream types can correspond to the frequency of invalidating the data. Data invalidated relatively infrequently can be referred to as "cold" data or "static" data. Data invalidated more frequently than cold data can be referred to as "warm" data. Data invalidated more frequently relative to "cold" data and "warm" data can be referred to as a "hot" data.

As an example, there may be three categories. One category can correspond to a lowest invalidation velocity range, another category can correspond to a middle invalidation velocity range, and another category can correspond to a highest invalidation velocity range. Cold data can have low invalidation velocity and can be assigned to the category corresponding to the lowest invalidation velocity range. Warm data can have a higher invalidation velocity range, and can be assigned to the category corresponding to the middle invalidation velocity range. Hot data can have the highest invalidation velocity and can be assigned to the category corresponding to the highest invalidation velocity range. Embodiments are not limited to this example, and various other categories (e.g., data stream types) can be implemented based on various determined invalidation velocity and/or acceleration information corresponding to the data.

For instance, data types can correspond to workload characteristics. For example, a workload characteristic can include how the data is being written to memory. Randomly written data (also herein referred to as "random data") is host data being written to random non-sequential logical addresses corresponding to relatively small amounts of data. Sequentially written data (also herein referred to as "sequential data") is host data being written to a number of sequential logical addresses corresponding to relatively large amounts of data. Random data and sequential data can exhibit predictable and/or particular characteristics in respective VTC profiles. For example, purely randomly written data stored in blocks can exhibit a VTC profile that is relatively predictable (e.g., based on modeling) and that shows the VTC curve steadily decreasing over time. The particular VTC profile for purely random data can depend on various factors, such as the quantity of blocks, capacity of the blocks, the amount of over provisioning, the particular garbage collection algorithm, etc. In a number of embodiments, the VTC profile for purely random data can be used as a baseline for comparing VTC profiles of other data. For example, deviation from the baseline VTC profile can indicate the block does not contain purely random data. As an example, sequentially written data stored in blocks or block stripes is likely invalidated together as a group, which leads to a relatively large and abrupt increase in the VTC corresponding to the block. In contrast, a block storing a mix of randomly written data and sequentially written data can exhibit a particular invalidation pattern corresponding to a mix of the random data VTC profile and the sequential data VTC profile. A mixed block is a block containing randomly written data and sequentially written data. The invalidation rate of the mixed block can show an abrupt change when the sequential data is invalidated and a steady slope for the random data invalidation. For example, the invalidation velocity can be constant over time for random data, but change rapidly over time for sequential data.

Figure 1A:
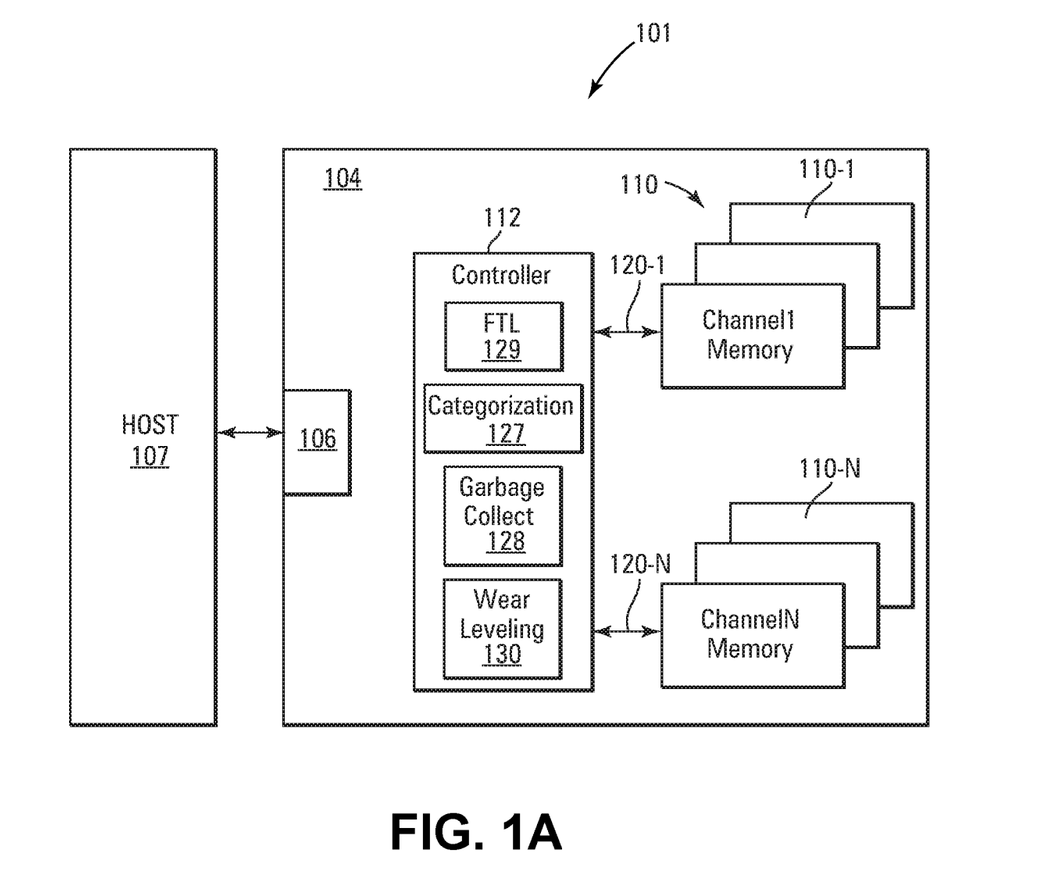
FIG. 1A is a block diagram of a system configured to perform data categorization in accordance with a number of embodiments of the present disclosure.
Figure 1B:
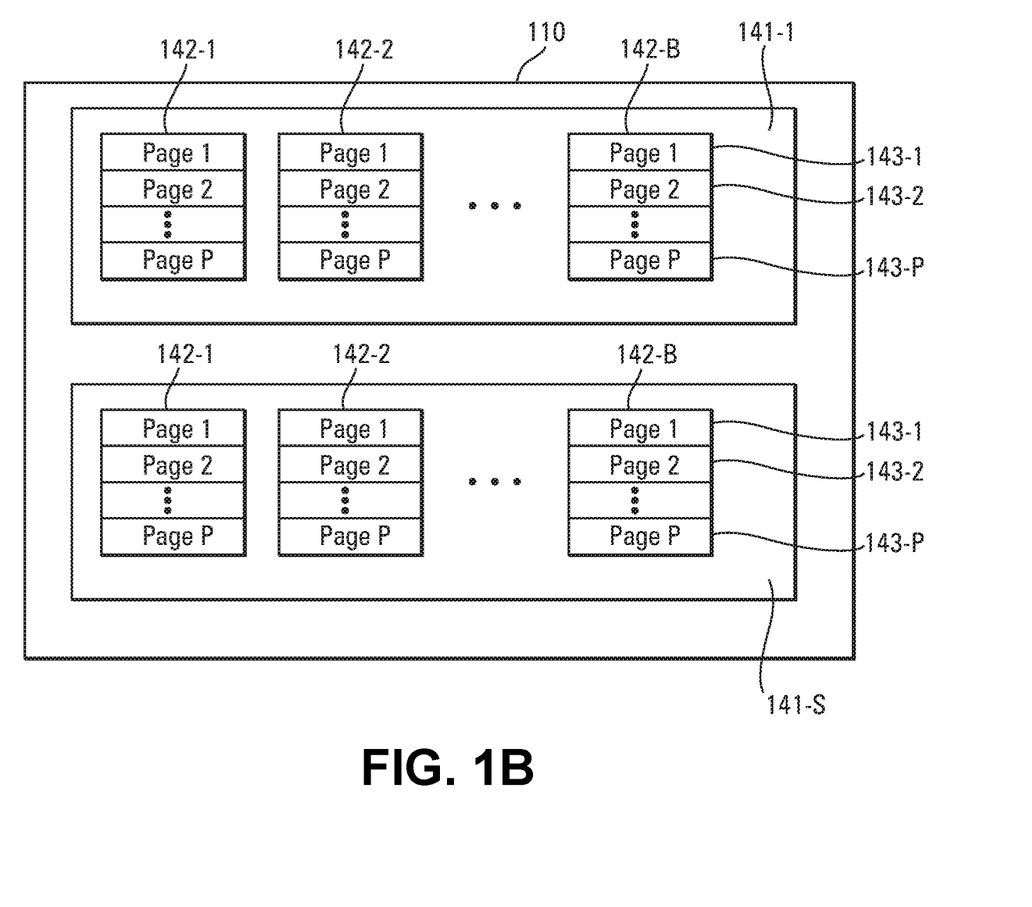
FIG. 1B illustrates a block diagram of an example of a portion of memory, such as that shown in FIG. 1A, in accordance with one or more embodiments of the present disclosure.
Figure 1C:
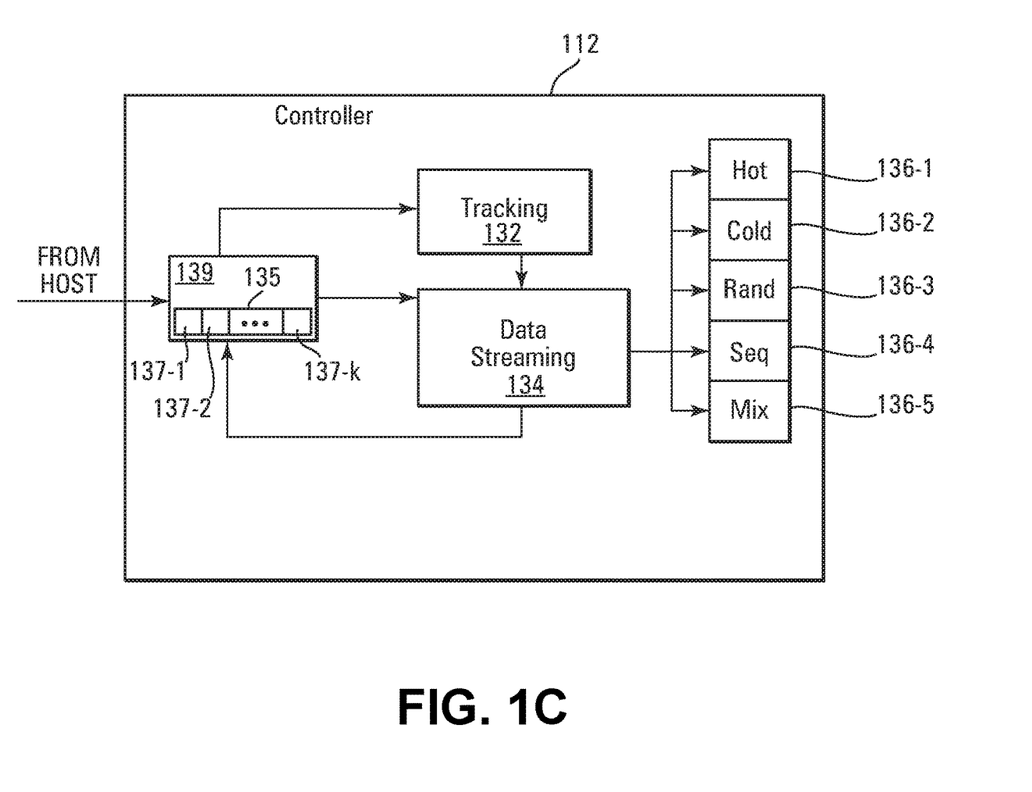
FIG. 1C is a block diagram of an example of a controller, such as that shown in FIG. 1A configured to perform data categorization in accordance with a number of embodiments of the present disclosure.

In a number of embodiments, the valid PTU count (VTC) of blocks can be tracked, and the VTC history can be used to assign various categories (e.g., as shown in FIG. 1C) to the blocks. The categories can correspond to different workload characteristics (e.g., random data workload, sequential data workload, mixed random/sequential workload) and/or other data type characteristics (e.g., hot data, warm data, cold data, etc.). In a number of embodiments, an operation (e.g., garbage collection, buffer flushing, wear leveling) can be performed using the assigned block categories. As an example, logical address ranges belonging to data streams being assigned the different categories can be identified, and the corresponding data (e.g., PTUs) can be placed in particular blocks based thereon. As such, during the garbage collection process, an internal write cursor or write process can place data having a same or similar life span in a same block, thus reducing write amplification. In some examples, a host may indicate a stream identifier for a stream command. For example, the stream identifier may identify a data stream corresponding to the stream command. In some examples, the stream command may be a non-volatile memory express (NVMe) stream command or a serial attached small computer system interface (SAS) stream command. For example, the data streams may be categorized according to their VTC histories (e.g., invalidation velocities and/or invalidation accelerations), and the stream identifier in the corresponding command may be used identify the categorized stream.

In various examples, data may be recategorized in response to its invalidation velocity and/or invalidation acceleration changing. For example, if the invalidation velocity increases from that corresponding to cold data to that for hot data, the category of the data may be changed from cold data to hot data, and the data may be redirected to a hot data block, for example, in a future garbage collection operation. In other examples, data may be changed from cold data to hot data in response to its invalidation acceleration changing.

FIG. 1A is a block diagram of an apparatus in the form of a computing system 101 in accordance with a number of embodiments of the present disclosure. The computing system 101 includes a storage system 104 that may be, for example, a solid-state drive (SSD). In the example of FIG. 1A, storage system 104 is coupled to a host 107 (e.g., via an interface 106) and includes a memory 110 and a controller 112 (e.g., an SSD controller), such as a processing device.

As used herein, a storage system (e.g., 104), a controller (e.g., 112), and/or a memory (e.g., 110) may separately be considered an "apparatus".

Memory 110 can include one or more memory devices which can serve as storage for the system 101. The memory 110 comprises a number of channel memories 110-1 to 110-N coupled to controller 112 via respective channels 120-1 to 120-N. Each channel memory can comprise a number of memory devices (e.g., memory chips, memory dies, etc.), which may include a number of arrays of memory cells. Multiple channel memories can provide benefits such as increased throughput, for example, due to the availability of parallel execution on multiple channels. The constituent arrays of the memory devices may be for example, non-volatile arrays, such as flash arrays with a NAND architecture. However, embodiments are not limited to a particular type of memory array or array architecture.

Host 107 can be a host system, such as a personal laptop computer, a desktop computer, a digital camera, a mobile telephone, or a memory card reader, among various other types of hosts. Host 107 can include a system motherboard and/or backplane and can include a number of memory access devices (e.g., a number of processors). Host 107 can also be a memory controller, such as where storage system 104 is a memory device (e.g., having on-die control circuitry 112). In some examples, host 107 may be part of a cloud or enterprise server.

The controller 112 can communicate with the memory 110 to control data read, write, and erase operations, among other operations. In some embodiments, the controller 112 can be on the same die or a different die than any or all of the memory devices comprising memory 110. As an example, the controller 112 can comprise a state machine, a sequencer, and/or some other type of control circuitry, which may be implemented in the form of an application particular integrated circuit (ASIC) coupled to a printed circuit board.

Although not specifically illustrated, in some embodiments, the controller 112 can include a discrete memory channel controller for each channel coupling the controller 112 to the memory channels 110-1 to 110-N. The controller 112 can include, for example, a number of components in the form of hardware and/or firmware (e.g., one or more integrated circuits) and/or software for controlling access to the memory 110 and/or for facilitating data transfer between the host 107 and memory 110.

The controller 112 can include a categorization component 127, an FTL (flash translation layer) component 129, a garbage collection component 128, and a wear leveling component 130. The categorization component 127 can track the history of valid PTU counts corresponding to respective groups of cells and use the history of valid PTU count to determine an invalidation velocity and/or invalidation acceleration associated with respective groups. The categorization component 127 can use the invalidation velocity and/or invalidation acceleration to assign one or more categories to the blocks. The categorization component 127 can cause an operation (e.g., garbage collection, buffer flushing, wear leveling) to be performed using the assigned block categories. The categorization component 127 is described in greater detail below in conjunction with FIG. 1C.

Host 107 addresses blocks of data stored on the storage system 104 using a logical address. The data is stored on the storage system 104 at a physical address in the memory 110. The FTL 129 can be responsible for performing logical to physical address mapping for the system 104. As an example, the mapping granularity of the FTL 129 may be in terms of translation units (TUs). A size of a TU can correspond to, for example, a number of pages of data (e.g., 4 KB, 8 KB, etc.), which may correspond to a number of host sectors (e.g., 512B, 1 KB, 2 KB, etc.). For example, a host sector refers to an amount of data that is sent from the host to the storage system and that corresponds to a logical address specified by the host. Each logical TU (LTU) is mapped to a physical TU (PTU), which corresponds to a unique physical location in memory 110. A LTU address can correspond to one or more host logical addresses, for example. The FTL 129 can maintain a logical to physical table (L2P) table to manage the relationship between the logical addresses of data used by the host 107 and the physical addresses in which data is actually stored in the memory 101. The L2P table can be an LTU to PTU mapping table, as described in greater detail below in conjunction with FIG. 4.

In operation, controller 112 may receive data access requests (e.g., read commands, write commands, etc.) from host 107. The requests can correspond to associated logical addresses, and controller 112 can determine the location, for example, in memory 110, of the corresponding data based on a logical to physical (L2P) mapping table. L2P mappings can be invalidated, for example, in response to replacing data corresponding to a particular LTU, such as replacing data corresponding to a logical address range, for example, that includes a range of logical addresses with a starting logical address and ending with logical address. In some examples, replacing data may be referred to as updating data, and a PTU that replaces an invalidated PTU may be referred to as an updated PTU. The L2P mapping to the physical address of a PTU in a physical page is invalidated when the PTU is replaced by a PTU written to a different physical page. The PTU corresponding to the invalidated (e.g., stale) mapping entry can be identified as invalid, since the corresponding LTU now maps to a different PTU (e.g., a different physical page). The controller 112 can identify the invalidation of the PTU and can decrease the valid PTU count (VTC) of the block 142 to which the now invalid PTU belongs and which can be later erased, for example, as part of garbage collection. For example, if the physical translation unit (PTU) belongs to a block that is invalidated, the VTC for that block is decremented by number of invalidated PTUs. The updated PTU (e.g., page) is written to a free (e.g., erased) block in memory 110. In some examples, the VTC may be stored in the memory of the storage device, such as in the form of a table (e.g., table 112 in FIG. 2).

The free block may be selected from a pool of free blocks, which can be maintained by a garbage collection process, in which a candidate block is selected for erasure and the valid PTUs within the candidate block are relocated. The garbage collection process may be performed in accordance with embodiments described herein.

The garbage collection component 128 and wear leveling component 130 of controller 112 can perform various operations based on category assignments made by the categorization component 127 as described further herein.

As used herein, the term "coupled" may include electrically coupled, directly coupled, and/or directly connected with no intervening elements (e.g., by direct physical contact) or indirectly coupled and/or connected with intervening elements. The term coupled may further include two or more elements that co-operate or interact with each other (e.g., as in a cause and effect relationship).

FIG. 1B illustrates a portion of storage system 104, in accordance with a number of embodiments of the present disclosure. The example of FIG. 1B shows a portion of a memory, such as memory 110, that includes one or more block stripes, such as block stripes 141-1 to 141-S, which may be referred to collectively as block stripes 141. Each of the block stripes 141 includes a one or more blocks of memory cells, such as blocks 142-1 to 142-B, which may be referred to collectively as blocks 142. As an example, a block stripe 141 may comprise blocks within a same channel, memory device, memory die, etc.; however, embodiments are not so limited. For instance, a block stripe 141 may comprise blocks 142 from a number of different channels, memory devices, memory dies, etc.

Each of memory blocks 142-1 to 142-B is arranged in pages, such as pages 143-1 to 143-P. In some examples, a page may include or may be a portion of a PTU. In an example, a page stripe may be defined as commonly numbered (addressed) pages within a block stripe (e.g., page 1 from each of the constituent blocks). In some examples, block stripes 141-1 and 141-S may be determined to have different invalidation velocities and/or invalidation accelerations, in accordance with embodiments of the present disclosure, and may be assigned to different categories (e.g., by categorization component 127) based on their different invalidation velocities and/or invalidation accelerations.

FIG. 1C is a block diagram of a controller, such as controller 112, in accordance with a number of embodiments of the present disclosure. In this example, controller 112 includes an interface component 139, which may be part of a "front end" portion of controller 112. Interface component 139 can implement a segmented buffer scheme (e.g., via a segmented buffer 135) as described further herein. The buffer 135 can be referred to as a host data buffer, which may include segmented (e.g., separate) buffers 137-1 to 137-K. The buffers may be registers, such as latches. In some examples, buffer 135 may be a static random access memory (SRAM), and the buffers may be SRAM cells. Controller 112 includes a tracking component 132 and a data streaming component 134. The tracking component 132 and data streaming component 134 can be part of categorization component 127 in FIG. 1A. The tracking component 132 and data streaming component 134 can be used to categorize data streams into a number of categories as described herein. In this example, the categories include a hot data stream 136-1, a cold data stream 136-2, a random data stream 136-3, a sequential data stream 136-4, and a mixed data stream 136-5. For example, other categories (not shown in FIG. 1C) may include cold sequential, cold random, hot sequential, hot random, etc. In some examples, tracking component 132 and/or data streaming component 134 may be part of the garbage collection component 128 and/or the wear leveling component 130 shown in FIG. 1A, for example.

Tracking component 132 is configured to track the number of valid pages (e.g., PTUs) in each block and/or block stripe over time. For example, tracking component 132 tracks the history of valid PTU counts (e.g., the VTC) corresponding to respective groups of memory cells (e.g., per block and/or block stripe). The VTC history can be tracked based on changes to VTCs over time and/or by tracking changes to a VTC curve profile corresponding to a system (e.g., SSD system) over time.

As indicated previously, the VTC profile shows how the VTC behaves with time (e.g. the timewise behavior of the VTC). Tracking component 132 keeps track of the VTC for each particular group of cells at each of a number of predetermined instants of time during each of a number of predetermined lengths of time (e.g. time periods), for example, during a write operation from host 107 to storage device 101. A VTC profile may include a VTC at each of the instants of time during each time period. For example, a VTC profile may be obtained for a particular group of cells for each of the number of the time periods to yield a number of VTC profiles for the particular group of cells. This allows tracking component 132 to track the VTC profile for the particular group of cells over time, since there will be a VTC profile for each of the time periods. In some examples, the time instants correspond to each time a PTU in the particular group of cells is invalidated, and the period of time may be selected to include a predetermined number of time instants.

Tracking component 132 can determine an invalidation velocity from the slope of the VTC profile for each of the number of the time periods to yield a number of invalidation velocities. This allows changes in the invalidation velocity to be tracked over time, since there will be an invalidation velocity for each of the different time periods. In some instances, tracking component 132 can determine the invalidation acceleration from the time rate of change of the invalidation velocity for each of the number of the time periods to yield a number of invalidation accelerations. This allows changes in the invalidation acceleration to be tracked over time, since there will be an invalidation acceleration for each of the different time periods.

In a number of embodiments, the identification of logical addresses corresponding to particular data streams can be used to place data, for example host data as opposed to valid data during garbage collection, into particular blocks. As an example, data stream identifiers corresponding to the respective different categories can be used to determine which particular blocks should receive host data. In a number of embodiments, the controller can include a buffer (e.g., a host data buffer), which can be segmented such that host data corresponding to respective different data stream categories, for example, as identified based on VTC history tracking, is stored in different segments. A buffer allocation scheme can be implemented in which buffer flush rates are based on the data stream categories. For example, "hot" data can be flushed less frequently than cold data, since the hot data will be invalidated sooner than cold data (or even while the hot data still resides in the buffer). In contrast, "cold" data (e.g., static data) can flushed more quickly since it will be valid longer. Additionally, knowledge of data stream category can be used for wear leveling purposes. For example, host data categorized as static can be stored in a block having a relatively high erase count. Moreover, the host data buffer segments can be flushed responsive to garbage collection activity. For instance, flush priority can be given to buffer data belonging to a candidate block in order to reduce garbage collection activity.

Figure 2:
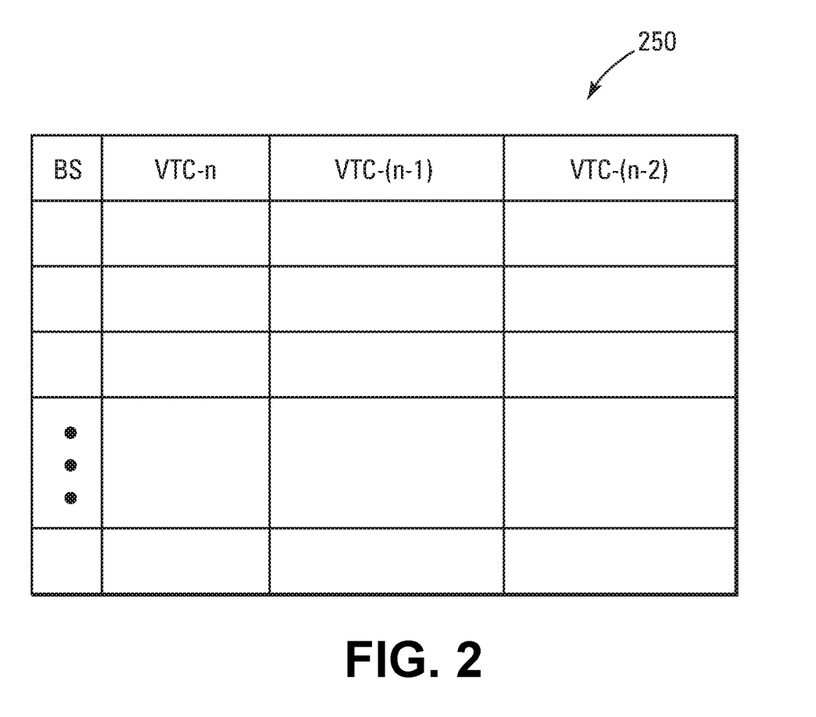
FIG. 2 is an example of a data structure that can be used for tracking valid track counts in association with performing data categorization in accordance with a number of embodiments of the present disclosure.

FIG. 2 illustrates an example data structure that can be used to track the history of valid PTU counts for one or more groups of memory cells, according to one embodiment of the present disclosure. A group of cells can refer to a group of cells in a block or a group of cells in a block stripe. The data structure can be a table 250. In this example, the table 250 includes entries for block stripes. Each entry can include a block stripe identifier and the valid PTU count (VTC) for the respective block stripe identifier at various instants of time (e.g., VTC-n, VTC-(n−1) and VTC-(n−2)). The instants of time may occur each time the PTU in a group of cells is invalidated. An entry containing the VTC at various instants of time for a particular block stripe represents the timewise variation of the VTC, and thus the VTC profile, for particular block stripe. In some examples, tracking component 132 creates and maintains table 250. Tracking component 132 may determine the VTC of a block stripe each time a PTU in the block stripe is invalidated, and the L2P mapping of the invalidated PTU is changed. Tracking component 132 may store the VTCs in table 250 that may be stored in memory 110 of storage device 104.

A number of PTUs may be overwritten, and thus invalidated, at each of the instants of time, thereby reducing the VTC at each instant of time. Tracking component 132 can use the history of valid PTU counts, for example, from table 250, to determine an invalidation velocity and/or invalidation acceleration associated with respective groups of cells. The invalidation velocity may be the difference between the VTCs in a pair of adjacent of the columns of table 250 divided by the time difference between the pairs adjacent columns. For example, an invalidation velocity V1 may be V1=(VTC-n−VTC-(n−1))/(time-n−time-(n−1)), and another invalidation velocity V2 may be V2=(VTC-(n−1)−VTC-(n−2))/(time-(n−1)−time-(n−2)). An invalidation acceleration may be the difference between V1 and V2 divided by a time difference between V1 and V2. Tracking component 132 may determine a respective invalidation velocity for each respective block stripe from the respective timewise variations of the VTC in table 250. Tracking component 132 may further track the respective invalidation accelerations of the block stripes.

Tracking component 132 may further assign the categories previously described and combinations thereof to the block stripes based on the invalidation velocities. Each of the respective categories may correspond to a respective range of invalidation velocities and/or invalidation accelerations. The ranges and their respective categories may be stored in memory 110, for example, in the form of a table in which each table entry includes a category and its corresponding range of invalidation velocities and/or invalidation accelerations. Tracking component 132 may send a determined invalidation velocity and/or invalidation acceleration to data streaming component 134. Data streaming component 134 may use the invalidation velocity and/or invalidation acceleration to assign a category, such as one or more of the categories 136, to the determined invalidation velocity and/or invalidation acceleration in response to determining the range in which the determined invalidation velocity and/or invalidation acceleration lies.

Tracking component 132 may be configured to rank each respective block stripe at each of a number of instants of time according to its VTC at the respective instant of time. Ranking criteria can include, for example, the VTC and/or the rate of change of the VTC at the instant of time. In some examples, the lower the VTC and/or the rate of change of the VTC, the higher the rank or vice versa.

Figure 3:
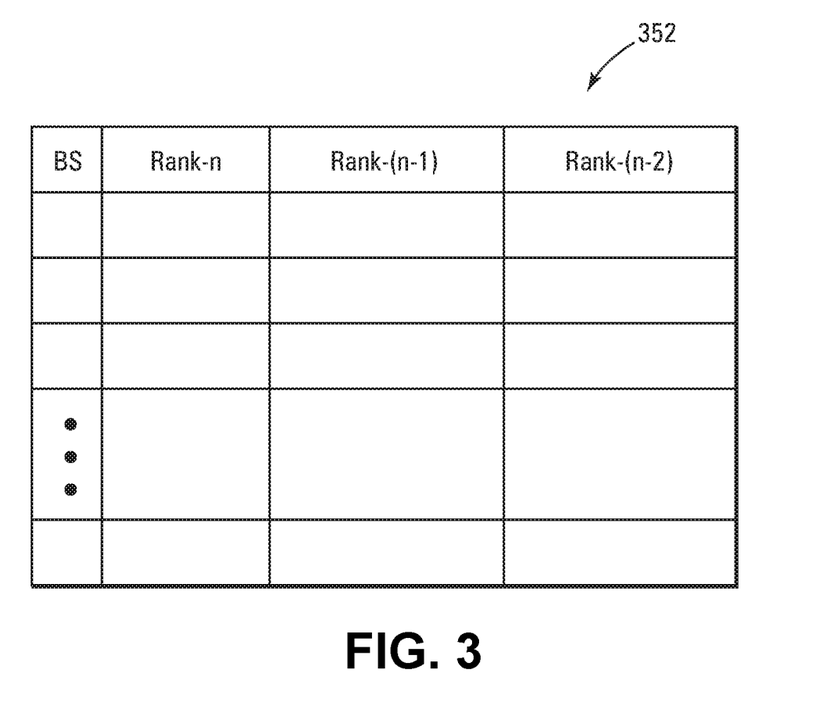
FIG. 3 is an example of a data structure for ranking data in conjunction with performing data categorization in accordance with a number of embodiments of the present disclosure.

FIG. 3 is an example of a data structure for ranking data in conjunction with performing data categorization in accordance with a number of embodiments of the present disclosure. For example, the data structure can be a table 352. In this example, the table 352 includes entries for block stripes. Each entry can include a block stripe identifier and the ranking for the respective block stripe identifier at various instants of time. The instants of time can correspond to instants of time in table 250. For example, Rank-n, Rank-(n−1), and Rank-(n−2) may respectively be at the same instants of time of VTC-n, VTC-(n−1), and VTC-(n−2).

In some examples, a block stripe may be selected for garbage collection based on its rank. For example, a block stripe having a rank corresponding to the lowest VTC and/or the rate of change of the VTC (e.g., highest rank) may be selected for garbage collection before block stripes with higher VTCs (e.g., lower ranks). In another example, a block stripe may be selected for wear leveling based on its rank.

For example, a block stripe having the lowest rank may be selected for wear leveling before block stripes with higher ranks. For example, controller 112 may cause wear leveling component 130 to perform wear leveling on the block stripes based on the ranking determined by categorization component 127.

Figure 4:
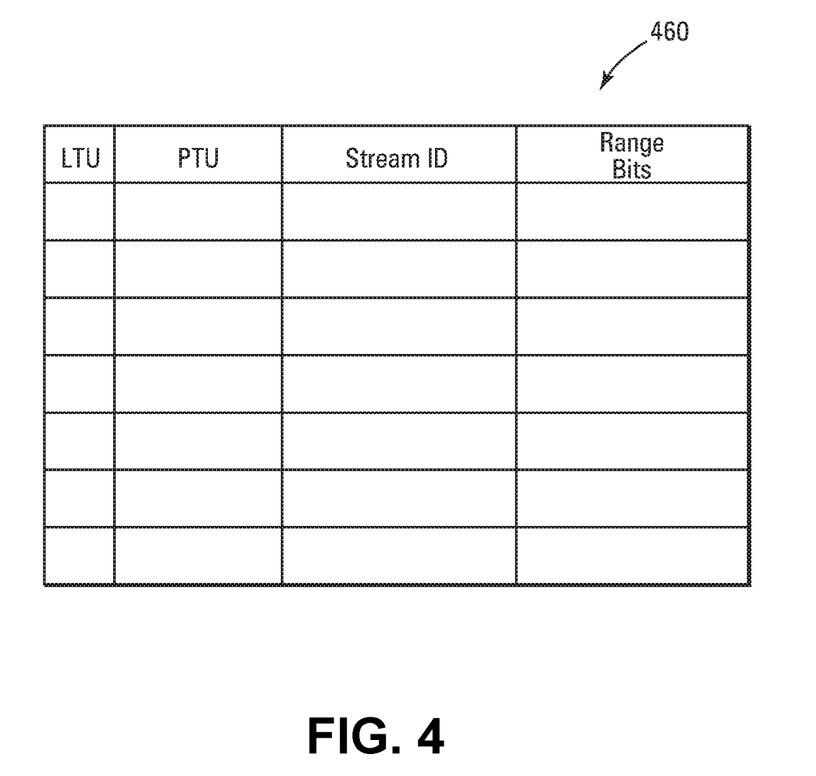
FIG. 4 is an example of a mapping data structure that can be used in association with performing data categorization in accordance with a number of embodiments of the present disclosure.

FIG. 4 is an example of a mapping data structure that can be used in association with performing data categorization in accordance with a number of embodiments of the present disclosure. In some examples, controller 112 maintains the mapping table 460 in FIG. 4. Table 460 may be stored in memory 110 of storage device 104, for example. Table 460 includes (e.g., 32-bit) logical addresses for a number of logical translation units (LTUs) that correspond to units (e.g., chunks) of data from host 107. Table 460 includes (e.g., 32-bit) physical addresses for PTUs and maps the logical addresses of the LTUs to physical addresses of the PTUs. The logical to physical address mappings are updated as the PTUs are invalidated. Table 460 maps respective (e.g., four-bit) stream identifiers (IDs) to the respective logical to physical address mappings. For example, table represents assignments of the respective (e.g., four-bit) stream identifiers (IDs) to the respective logical to physical address mappings, and data streaming component 134 assigns the respective (e.g., four-bit) stream identifiers (IDs) to the respective logical to physical address mappings based on table 460. The stream identifiers indicate the category of the stream, and the category is assigned to the stream based on an invalidation velocity and/or invalidation acceleration, as is described in more detail below.

In some examples, a portion of the logical addresses, such as a number of upper bits, may be used as a stream identifier with different bit patterns corresponding to assigned data stream categories. In an example, streams may be identified using identifiers specified in stream commands from host 107, such as NVMe or SAS stream commands, from host 107. For example, a stream identifier may include an identifier specified in a command, such as NVMe or SAS stream command, from host 107, that corresponds to the stream.

Table 460 represents an L2P mapping table comprising a number of mapping entries. In table 460, "LTU" represents a LTU address (e.g., a number of logical address bits), "PTU" represents a PTU address (e.g., a number of physical address bits), "Stream ID" represents a number of bits corresponding to a data stream categorization, and "Range Bits" represents a number of bits used to identify a range of logical addresses (e.g., LBAs) to which a particular Stream ID corresponds. In an example, the range of logical addresses may correspond to a stream corresponding to a command (from the host), such as an NVMe or an SAS command, that includes a stream identifier that identifies the stream, and the stream identifier included in the command may be used as the stream identifier in table 460.

In some examples, tracking component 132 determines an invalidation velocity and/or invalidation acceleration for a group of memory cells corresponding to a range of logical addresses, corresponding to a set of range bits in table 460. Tracking component 132 sends the range of logical addresses and the i invalidation velocity and/or invalidation acceleration to data streaming component 134. Data streaming component 134 uses the invalidation velocity and/or invalidation acceleration to determine what category corresponds to the determined invalidation velocity and/or invalidation acceleration, as described previously. Data streaming component 134 then assigns a stream identifier, indicative of the determined category to the range bits, as is represented by table 460. In addition, data streaming component 134 assigns the LTU address that is in the range of logical addresses to the stream identifier, and the L2P mapping assigns the PTU address to the LTU address and the stream identifier The respective range bits may be used to track, for example, the logical block addresses to which a respective stream identifier is assigned. For example, a respective stream identifier may be adjusted to correspond to a particular category based on the invalidation velocity for the respective range bits. In some examples, the range bits may be sent (e.g., fed back) to interface component 139 so that interface component 139 knows which range of logical addresses and which LTU correspond to which category.

In some examples, data streaming component 134 may assign respective stream identifiers to respective separate buffers 137-1 to 137-K of buffer component 135, thus assigning respective categories to respective buffers. For example, respective ones of separate buffers 137-1 to 137-K, and thus the separate buffers may receive data having a particular category stream. For example, data from host 107 may have a particular LTU address that is mapped to a particular stream identifier by table 460. The data may then be sent to the buffer that is assigned the particular stream identifier. Data streaming component 134 may indicate to interface component 139 which stream identifiers correspond to which LTUs, and interface component 139 may send the data corresponding to the LTUs to the buffers corresponding to the stream identifiers. For example, interface component 139 may send data corresponding to a specific range of logical addresses, as identified by its corresponding range bits, to the buffer with a stream identifier corresponding to those range bits.

Controller 112 may prioritize when the data in the separate buffers are to be sent to the memory based on the categories (e.g., the stream identifiers) assigned to the separate buffers. In some examples, controller 112 may perform garbage collection on the memory based on the stream identifiers assigned to the buffers, and thus the data in the buffers.

Buffers assigned to categories with higher invalidation velocities may correspond to the particular blocks in memory, such as for storing hot data. Controller 112 may cause data in buffers that invalidate regions in the memory with lower VTCs to be sent to the memory before data in buffers assigned to categories with higher invalidation velocities. Controller 112 may then cause garbage collection to be performed all of the invalidated regions before the data in buffers assigned to categories with higher invalidation velocities. After the garbage collection, controller 112 may then cause the data in buffers assigned to categories with higher invalidation velocities to be sent to the memory. This process acts to reduce the amount of garbage collected data and the write amplification.

In some examples, block stripes and data streams may be further categorized based on their invalidation accelerations. Data in a buffer assigned to a lower invalidation acceleration may be sent to the memory before data in a buffer assigned to a higher invalidation acceleration. In some examples, garbage collection may be delayed for block stripes having higher accelerations relative to block stripes having lower accelerations.

Categorizing the various streams allows the for the performance of the streams to be monitored with regard to the impact of the quality of service (QoS) on the streams, the input/output (IOP) of the various streams, and the write amplification associated with each stream.

It will be appreciated by those skilled in the art that additional circuitry and signals can be provided, and that the apparatus of FIGS. 1A-1C has been simplified. It should be recognized that the functionality of the various block components described with reference to FIGS. 1A-1C may not necessarily be segregated to distinct components or component portions of an integrated circuit device. For example, a single component or component portion could be adapted to perform the functionality of more than one block component of FIGS. 1A-1C. Alternatively, one or more components or component portions could be combined to perform the functionality of a single block component of FIGS. 1A-1C.

Figure 5:
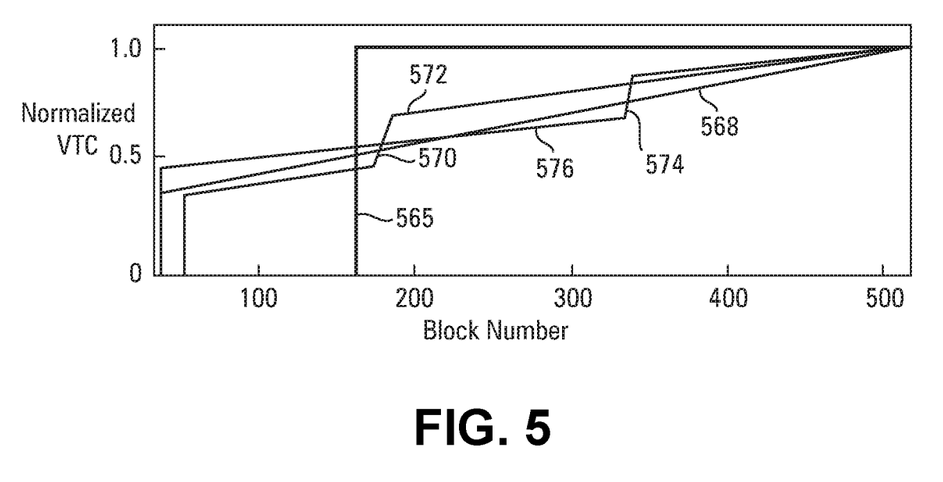
FIG. 5 is an example of a graph illustrating valid track count curves associated with different workloads associated with performing data categorization in accordance with a number of embodiments of the present disclosure.

FIG. 5 presents (e.g., linear) approximations of various normalized VTC versus block number curves for a particular block stripe, in accordance with a number of embodiments of the present disclosure. For example, the block number may be a block stripe number, and the normalized VTC may be the number of valid PTUs in a block stripe divided by the total number of PTUs in that block stripe. The respective curves may correspond to different workloads, for example. In some examples, the curves may be referred to as sorted VTC curves (e.g., the block stripes may be sorted according to the VTC). It should be noted that the VTCs represented by the curves in FIG. 5 may correspond to a particular instant of time, such as one of the instants of time in table 250, and are the number of VTCs in the block stripes corresponding to the block numbers.

Curve 565 corresponds to sequential data, in which all of the data are valid. Curve 568 corresponds to purely random data. Curves 572 and 576 correspond to sequential data and a mixture of random and sequential data. Most of the data in the block stripes to the left of transition 570 in curve 572 and to the left of transition 574 in curve 576 are sequential data. The data in the block stripes to the right of the respective transitions 570 and 574 are a mixture of random and sequential data. Transitions 570 and 574 are the result of rewriting previously written data. The curves in FIG. 5 provide insight in to the behavior of the memory. For example, purely sequential data and intermixing of random and sequential data can be deduced from the curves. For example, curve 565 indicates that the block stripes are receiving sequential data; curve 568 indicates that the block stripes are receiving sequential data; and curves 572 and 576 indicate that some blocks are receiving mainly sequential data and some are receiving a mixture of sequential and random data. The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

What is claimed is:

1. A system, comprising:
a memory comprising a plurality of groups of memory cells; and
a controller coupled to the memory and configured to:
track respective invalidation velocities and invalidation accelerations of the plurality of groups of memory cells, wherein the invalidation accelerations are time rates of change of the respective invalidation velocities;
assign categories to the plurality of groups of memory cells based on the tracked invalidation velocities, the tracked invalidation accelerations, or both, of the plurality of groups of memory cells, wherein the assigned categories include a sequential data category and at least one additional category;
receive host data corresponding to a particular logical address range; and
responsive to determining that the particular logical address range is associated with a particular one of the assigned categories, write the host data to one of the plurality of groups of memory cells having the particular category assigned thereto.

2. The system of claim 1, wherein the at least one additional category includes:
a mixed data category associated with a mix of sequential data and random data;
a hot data category; and
a cold data category.

3. The system of claim 1, wherein the controller is configured to assign respective range identifiers to a plurality of logical address ranges, and wherein the range identifiers correspond to respective categories to which the plurality of groups of memory cells can be assigned.

4. The system of claim 1, wherein the categories to which the plurality of groups of memory cells can be assigned are based on respective data stream types.

5. The system of claim 1, wherein the controller is configured to maintain logical to physical address mappings for the memory, the address mappings including respective stream identifiers corresponding to the assigned categories.

6. The system of claim 1, wherein the controller is coupled to separate buffers to store received host data whose corresponding logical addresses correspond to different stream identifiers.

7. The system of claim 1, wherein the controller is configured to perform garbage collection on data stored in the memory based on the categories assigned to the plurality of groups of memory cells.

8. A method, comprising:
tracking respective invalidation velocities and invalidation accelerations corresponding to groups of memory cells in a memory wherein the invalidation accelerations are time rates of change of the respective invalidation velocities;

assigning data stream identifiers to the plurality of groups of memory cells based on the tracked invalidation velocities, the tracked invalidation accelerations, or both, wherein the assigned data stream identifiers include a sequential data stream identifier and at least one additional data stream identifier;

receiving host data corresponding to a particular logical address range; and responsive to determining that the particular logical address range is associated with a particular one of the assigned data stream identifiers, writing the host data to one of the groups of memory cells having the particular data stream identifier assigned thereto.

9. The method of claim 8, further comprising determining respective logical address ranges corresponding to the groups of memory cells.

10. The method of claim 8, wherein the data stream identifiers include a random data stream identifier.

11. The method of claim 8, wherein the method further comprises maintaining separate buffers on a controller to which the memory is coupled, the separate butlers for storing received host data prior to writing the data to the memory based on the tracked invalidation velocities.

12. An apparatus, comprising:
a plurality of groups of memory cells;
a processing device coupled to the plurality of groups of memory cells, the processing device configured to:
track respective invalidation velocities and invalidation accelerations of the plurality of groups of memory cells, wherein the invalidation accelerations are time rates of change of the respective invalidation velocities;
write received host data to the plurality of groups of memory cells based on respective data stream categories assigned to the plurality of groups of memory cells, Wherein the data stream categories are assigned based on the tracked invalidation velocities and invalidation accelerations corresponding to the respective plurality of groups of memory cells.

13. The apparatus of claim 12, wherein the apparatus includes an interface component comprising a segmented buffer configured to receive the host data.

14. The apparatus of claim 12, wherein the processing device is configured to:
identify logical address ranges corresponding the respective data streams; and
write received host data to the plurality of groups of memory cells in accordance with the identified logical address range corresponding thereto.

15. The apparatus of claim 12, wherein the processing device is configured to perform garbage collection more frequently on those groups of the plurality of groups having higher invalidation velocities than on those groups of the plurality of groups having lower invalidation velocities.

16. The apparatus of claim 12, wherein the groups of memory cells are blocks of NAND Flash memory cells.

* * * * *